(12) United States Patent
Terry

(10) Patent No.: US 10,050,817 B2
(45) Date of Patent: Aug. 14, 2018

(54) METHOD AND APPARATUS FOR CONTROLLING OUT-OF-BAND INTERFERENCE AND ERROR VECTOR MAGNITUDE (EVM) USING PEAK-TO-AVERAGE-POWER-RATIO (PAPR) REDUCTION WITH CONSTRAINTS

(71) Applicant: John David Terry, Annandale, VA (US)

(72) Inventor: John David Terry, Annandale, VA (US)

( * ) Notice: Subject to any disclaimer, the term of this patent is extended or adjusted under 35 U.S.C. 154(b) by 22 days.

(21) Appl. No.: 15/361,419

(22) Filed: Nov. 26, 2016

(65) Prior Publication Data

US 2017/0078133 A1 Mar. 16, 2017

Related U.S. Application Data

(63) Continuation-in-part of application No. 14/280,575, filed on May 17, 2014, now abandoned.

(51) Int. Cl.

| | |
|---|---|
| *H04L 27/26* | (2006.01) |
| *H04B 17/354* | (2015.01) |
| *H04J 11/00* | (2006.01) |
| *H04B 17/345* | (2015.01) |
| *H04B 17/373* | (2015.01) |

(52) U.S. Cl.
CPC ....... *H04L 27/2614* (2013.01); *H04B 17/345* (2015.01); *H04B 17/354* (2015.01); *H04B 17/373* (2015.01); *H04J 11/003* (2013.01)

(58) Field of Classification Search
CPC ............ H04L 27/2614; H04L 27/2615; H04L 27/2618; H04L 27/2624; H04L 27/2626; H04L 27/2649; H04L 27/2644; H04L 27/3411; H04L 25/0204; H04L 5/0007; H04J 11/00; H04J 11/0023

See application file for complete search history.

(56) References Cited

U.S. PATENT DOCUMENTS

| | | | | |
|---|---|---|---|---|
| 6,529,560 B1 * | 3/2003 | Creighton | .............. | H04B 1/707 375/284 |
| 8,787,873 B1 * | 7/2014 | Hitt | ......................... | H04W 8/20 455/406 |
| 9,172,574 B1 * | 10/2015 | Zillmann | ............ | H04L 27/3411 |

(Continued)

*Primary Examiner* — Hassan Kizou
*Assistant Examiner* — Roberta A Shand
(74) *Attorney, Agent, or Firm* — Patrick Mixon

(57) ABSTRACT

A method and system uses a constrained set of indexed samples to identify a next generation population of samples that exhibits a more desirable signal characteristic such as lower PAPR, out-of-band emission and error vector magnitude. The invention generates an intermediate set of indexed samples which are subjected to a fitness function and next generation calculations to produce next generation indexes for the next population of samples. The next generation indexes population of samples is further constrained over initial indexes for generating a more desirable signal characteristic. In dynamic spectrum access networks having OFDM components, the interference between collections of overlay and underlay signals is adaptively controlled based on the composite PAPR. In an example, the total out-of-band interference for the collection of overlay and underlay signals for all samples of the population are reduced.

18 Claims, 10 Drawing Sheets

(56) References Cited

U.S. PATENT DOCUMENTS

| | | | |
|---|---|---|---|
| 2010/0329401 A1* | 12/2010 | Terry | H04L 27/2615 375/346 |
| 2014/0192925 A1* | 7/2014 | Li | H04L 25/08 375/297 |
| 2015/0146805 A1* | 5/2015 | Terry | H04L 25/0204 375/260 |
| 2017/0033833 A1* | 2/2017 | Terry | H04B 1/7136 |

* cited by examiner

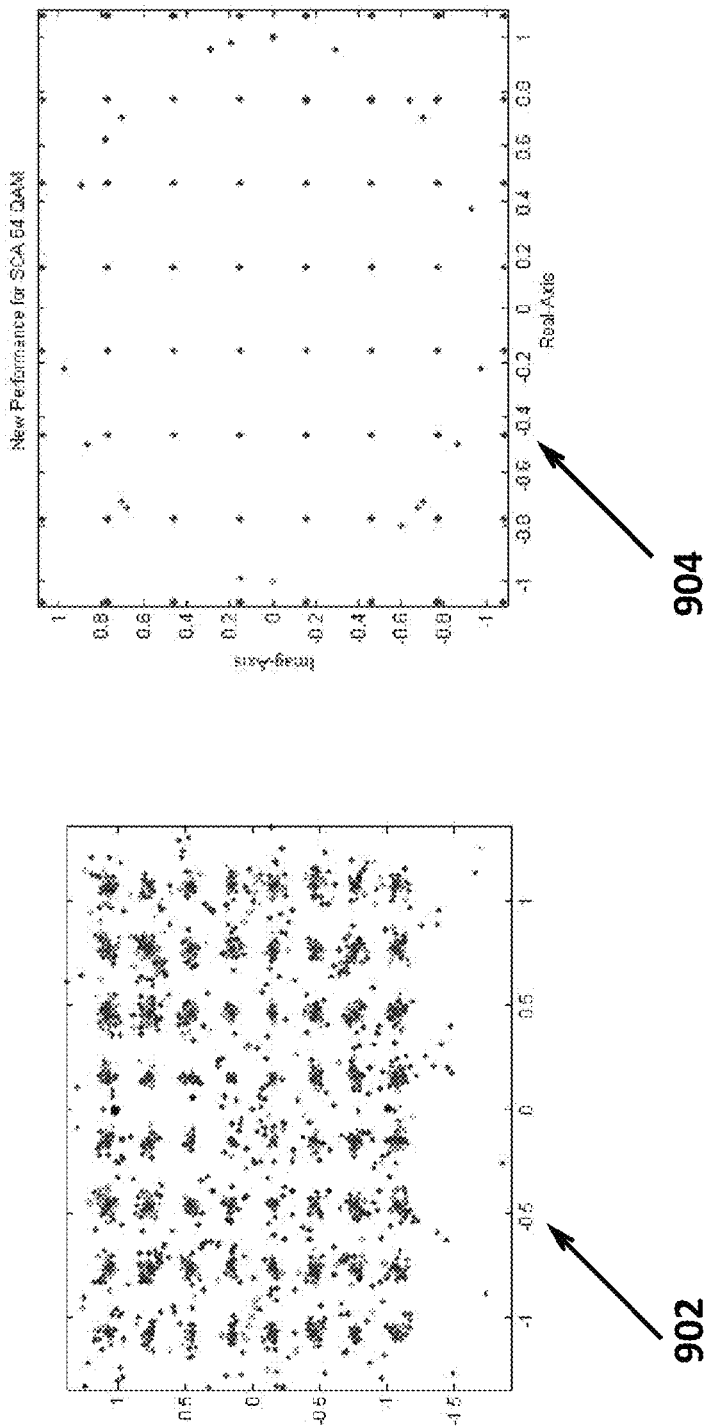
FIG. 9: EVM Effects of Constellation Symbols

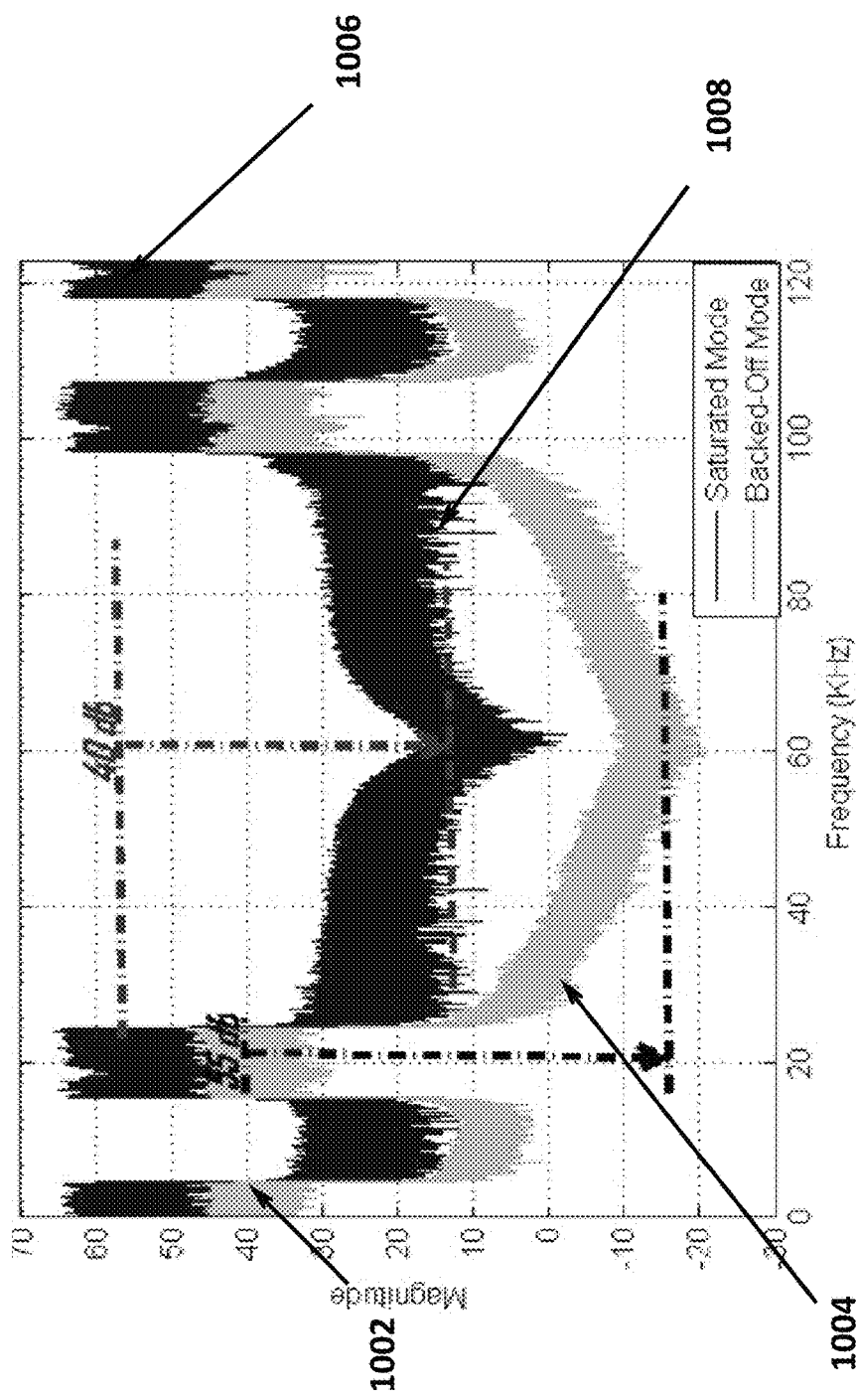
FIG. 10: Amplifier Degradation of OBI due PAPR

METHOD AND APPARATUS FOR CONTROLLING OUT-OF-BAND INTERFERENCE AND ERROR VECTOR MAGNITUDE (EVM) USING PEAK-TO-AVERAGE-POWER-RATIO (PAPR) REDUCTION WITH CONSTRAINTS

RELATED APPLICATIONS

This application is a continuation-in-part of and claims priority to U.S. patent application Ser. No. 14/280,575, titled, "A METHOD AND APPARATUS FOR CONTROLLING OUT-OF-BAND INTERFERENCE USING PEAK-TO AVERAGE-POWER RATIO (PAPR) WITH CONSTRAINTS", filed May 17, 2014, which is commonly owned by the inventor.

FIELD OF INVENTION

This invention relates generally to wireless communication systems. In particular, this invention relates to a method for controlling the peak-to-average-power-ratio (PAPR) of a collection of aggregate waveforms and the resulting out-of-band interference (OBI) and error-vector-magnitude (EVM) from clipping in crest factor reduction (CFR) algorithms.

BACKGROUND OF INVENTION

A wireless communication device in a communication system communicates directly or indirectly with other wireless communication devices. For direct/point-to-point communications, the participating wireless communication devices tune their receivers and transmitters to the same channel(s) and communicate over those channels. For indirect wireless communications, each wireless communication device communicates directly with an associated base station and/or access point via an assigned channel.

Each wireless communication device participating in wireless communications includes a built-in radio transceiver (i.e., transmitter and receiver) or is coupled to an associated radio transceiver. Typically, the transmitter includes one antenna for transmitting radiofrequency (RF) signals, which are received by one or more antennas of the receiver. When the receiver includes two or more antennas, the receiver selects one of antennas to receive the incoming RF signals. This type of wireless communication between the transmitter and receiver is known as a single-output-single-input (SISO) communication.

Generally speaking, transmission systems compliant with the IEEE 802.11a and 802.11g or "802.11a/g" as well as the 802.11n standards achieve their high data transmission rates using Orthogonal Frequency Division Modulation (OFDM) encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system. Similarly, multi-code spread spectrum system comprised of perfectly orthogonal high-speed chaos spreading codes transporting independent modulated data can be used to increase its overall throughput or transmission rate of the SISO system. The high-speed "spreading signals" belong to the class of signals referred to as Pseudo Noise (PN) or pseudo-random signal. This class of signals possesses good autocorrelation and cross-correlation properties such that different PN sequences are nearly orthogonal to one other. The autocorrelation and cross-correlation properties of these PN sequences allow the original information bearing signal to be spread at the transmitter.

Transmitters used in the wireless communication systems that are compliant with the aforementioned 802.11a/802.11g/802.11n standards as well as other standards such as the 802.16a IEEE Standard, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a high peak-to-average ratio (PAPR).

Likewise, the receivers used in the wireless communication systems that are compliant with the aforementioned 802.11a/802.11g/802.11n and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain signal.

To further increase the number of signals which may be propagated in the communication system and/or to compensate for deleterious effects associated with the various propagation paths, and to thereby improve transmission performance, it is known in the art to use multiple transmission and receive antennas within a wireless transmission system. Such a system is commonly referred to as a multiple-input, multiple-output (MIMO) wireless transmission system and is specifically provided for within the 802.11n IEEE Standard now adopted and being adopted in IEEE 802.16m and 3GPP-LTE Advance. As is known, the use of MIMO technology produces significant increases in spectral efficiency, throughput and link reliability, and these benefits generally increase as the number of transmission and receive antennas within the MIMO system increases.

In particular, in addition to the frequency channels created by the use of OFDM, a MIMO channel formed by the various transmissions and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different signal-to-noise ratio (SNRs) at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

In the MIMO-OFDM communication system, a high Peak-to-Average Power Ratio (PAPR) may be caused by the multiple carrier modulation. That is, because data are transmitted using multiple carriers in the MIMO-OFDM scheme, the final OFDM signals have amplitude obtained by summing up amplitudes of each carrier. The high PAPR results when the carrier signal phases are added constructively (zero phase difference) or destructively ('180 phase difference). Notably, OFDM signals have a higher peak-to-average power ratio (PAPR) than single-carrier signals do. The reason is that in the time domain, a multicarrier signal is the sum of many narrowband signals. At some instances in time, this sum is large and at other times is small, which means that the peak value of the signal is substantially larger than the average value. Similarly, MIMO schemes can have high PAPR for periodic sequence or binary-valued sequence.

High PAPR also results in MIMO schemes when multiple aggregate waveforms are transmitted in the same channel. In this instance, an aggregate waveform consists of a multiple combined individual waveforms/streams. The PAPR of an aggregate waveform is computed after combining the individual streams. Consequently, the highest PAPR amongst multiple aggregate waveforms is computed from the PAPRs of the combined individual waveforms. The continually increasing reliance on SISO and new focus on MISO/MIMO wireless forms of communication create an increasing need to decrease PAPR in these schemes.

Consider two similar channels, each with average power $P_0$ and maximum instantaneous power $P_1$. This corresponds to a peak-to-average power ratio PAPR=$P_1/P_0$, usually expressed in dB as PAPR[dB]=10 log($P_1/P_0$). For the combined signal, the average power is 2 $P_0$ (an increase of 3 dB), but the maximum instantaneous power can be as high as 4 $P_1$, an increase of 6 dB. Thus, PAPR for the combined signal can increase by as much as 3 dB and, in general, the PAPR increases by 10 log(n) for n signal. This maximum power will occur if the signals from the two channels happen to have peaks which are in phase. This may be a rare transient occurrence, but in general the linear dynamic range of all transmitter components must be designed for this possibility. Nonlinearities will create intermodulation products, which will degrade the signal and cause it to spread into undesirable regions of the spectrum. When the signal nonlinearity is not negligible, the signal passed through the nonlinear device can be decomposed into a linear part and an uncorrelated distortion part, by utilizing Bussgang Theorem in disclosed," "Bussgang, J. J., Cross-correlation functions of amplitude distorted Gaussian signals," res. Lab. Elec., MIT, 1952. This, in turn, may require filtering, and in any case will likely reduce the power efficiency of the system. By negligible, what is meant is meant is the value under consideration is within the tolerance required for that value within that system. A negligible value may have minimal impact on the receiver function.

This problem of the peak-to-average power ratio (PAPR) is a well-known general problem in OFDM and related waveforms, since they are constructed of multiple closely-spaced sub-channels. There are a number of classic strategies to reducing the PAPR, which are addressed in such review articles as "Directions and Recent Advances in PAPR Reduction Methods", Hanna Bogucka, Proc. 2006 IEEE International Symposium on Signal Processing and Information Technology, pp. 821-827, incorporated herein by reference. These PAPR reduction strategies include amplitude clipping and filtering, coding, tone reservation, tone injection, active constellation extension, and multiple signal representation techniques such as partial transmit sequence (PTS), selective mapping (SLM), and interleaving. These techniques can achieve significant PAPR reduction, but at the expense of transmit signal power increase, bit error rate (BER) increase, data rate loss, increase in computational complexity, and so on. EVM is the most popular figure of merit for evaluating in-band distortions in a communication system. Compared with BER, EVM not only quantifies the distortions, but also attributes the source of distortion to phase noise, modulator imbalances, power amplifier nonlinearities, and so on. EVM is more useful than BER when performing real-world RF design and troubleshooting. Because of its excellent troubleshooting capability, EVM has been adopted by many communication standards, such as wideband CDMA, wireless LAN, and wireless MAN. EVM has also been taken into account when formulating CFR algorithms. Further, many of these techniques require the transmission of additional side-information (about the signal transformation) together with the signal itself, in order that the received signal to be properly decoded. Such side-information reduces the generality of the technique, particularly for a technology where one would like simple mobile receivers to receive signals from a variety of base station transmitters. To the extent compatible, the techniques disclosed in Bogucka, and otherwise known in the art, can be used in conjunction with the techniques discussed hereinbelow.

Various efforts to solve the PAPR (Peak to Average Power Ratio) issue in an OFDM transmission scheme, include a frequency domain interleaving method, a clipping filtering method (See, for example, X. Li and L. J. Cimini, "Effects of Clipping and Filtering on the Performance of OFDM", IEEE Commun. Lett., Vol. 2, No. 5, pp. 131-133, May, 1998), a partial transmit sequence (PTS) method (See, for example, L. J Cimini and N. R. Sollenberger, "Peak-to-Average Power Ratio Reduction of an OFDM Signal Using Partial Transmit Sequences", IEEE Commun. Lett., Vol. 4, No. 3, pp. 86-88, March, 2000), and a cyclic shift sequence (CSS) method (See, for example, G. Hill and M. Faulkner, "Cyclic Shifting and Time Inversion of Partial Transmit Sequences to Reduce the Peak-to-Average Ratio in OFDM", PIM RC 2000, Vol. 2, pp. 1256-1259, September 2000). In addition, to improve the receiving characteristic in OFDM transmission when a non-linear transmission amplifier is used, a PTS method using a minimum clipping power loss scheme (MCPLS) is proposed to minimize the power loss clipped by a transmission amplifier (See, for example, Xia Lei, Youxi Tang, Shaoqian Li, "A Minimum Clipping Power Loss Scheme for Mitigating the Clipping Noise in OFDM", GLOBECOM 2003, IEEE, Vol. 1, pp. 6-9, December 2003). The MCPLS is also applicable to a cyclic shifting sequence (CSS) method.

In base station towers today, most 3G operators combine several narrow band signals and transmit them through a common power amplifier signal. However, the signal characteristics for 3G networks (such as WCDMA) differ greatly from current 4G technologies such as OFDM and OFDMA technologies, which tend to have extreme maxima and minima in their signal envelope, compared to nearly constant signal envelope. Spectrum combination for wide bandwidths is inherently more challenging for amplifier designers in terms of maintaining linearity across the total band. In addition, very high PAPR exacerbate the poor operational efficiency for the wideband power amplifier (PA). These PAs with lower efficiencies result in greater heat dissipation requiring better heat transfer mechanisms which lead to larger base stations, increasing operator's capital and operating expenditure. On the contrary, consider the case of over-driving the PA. As the amplifier over-drive is increased, higher power efficiency is achieved. As an example—disclosed in S.-C. Jung, O. Hammi, and F. M. Ghannouchi, "Design optimization and DPD linearization of GaN-based unsymmetrical Doherty power amplifiers for 3G multicarrier applications," *IEEE Microw. Theory Techn.*, vol. 57, no. 9, pp. 2105-2113, 2009.—when a linearized Doherty amplifier is over-driven by 3 dB, its efficiency increases to 47.52%, in contrast to the case of 38.03% efficiency when no over-drive is applied. This shows around 9% increase in PA's power efficiency with 3 dB over drive. However, in order to not impact the performance other active users of the spectrum, over-drive one's PA even beyond the limit imposed by the spectrum criteria of the adjacent channels where the spectrum limit is not met must be idle. What is need is an adaptive scheme which maximum amplifier efficiency while controlling the out-of-band interference to other users.

As noted earlier, many PAPR reduction techniques lead to distortion of the transmit signal characteristics, which is quantifiable by Error-Vector-Magnitude (EVM) and out-of-band spectral emissions. A goal of this invention is to minimize the effect of distortion on EVM and out-of-band spectral emission while reducing PAPR, which allows use of higher order modulation scheme to result in higher spectral efficiencies for the network. The error vector magnitude is a measure used to quantify the performance of a digital radio transmitter or receiver. A signal sent by an ideal transmitter or received by a receiver would have all constellation points precisely at the ideal locations, however various imperfections in the implementation (such as carrier leakage, low image rejection ratio, phase noise etc.) cause the actual constellation points to deviate from the ideal locations, EVM is a measure of how far the points are from the ideal locations. An error vector is a vector in the real and imaginary plane between the ideal constellation point and the point received by the receiver. In other words, the error vector may be the difference between actual received symbols and ideal symbols. The average power of the error vector, normalized to signal power, is the EVM. For the percentage format, root mean square (RMS) average is used. For example, the RMS may be, the square root of the arithmetic mean of the squares of the signal amplitudes, or the square of the function that defines the continuous waveform. In comparison, out-of-band spectral emission is predicated on the definition of what is considered the occupied bandwidth of the incoming signal. One common definition used in the art is the 99% occupied bandwidth, which is defined as the bandwidth that contains 99% of the total power of the signal. Governing regulatory body of the countries define a spectrum mask of allowable power relative to the total power that a device may transmitter in specified frequency bandwidths at certain offsets from the center of the occupied bandwidth. The out-of-band spectral emission is defined as the accumulative measured power starting at a frequency offset of 0.5 times the occupied or necessary bandwidth and extends up to 2.5 times the occupied or necessary bandwidth, respectively. In the present invention, the fitness function is constrained by the allowable over-drive level while meeting the linearity mask, which is adaptively estimated by an adjacent channel leakage ratio (ACLR) sensing algorithm, incorporated in the transmitter, that utilizes input drive signal power to the PA.

The continually increasing reliance on especially MISO wireless forms of communication creates a need for means to reduce the PAPR, especially in multi-carrier, multi-dimensional systems.

Then according to the prior art, what is needed is a system and method that reduces the PAPR of a data transmission by eliminating the guesswork involved in randomly generating indexed samples for PAPR optimization.

SUMMARY OF INVENTION

The present invention teaches improvements not found in the prior art. The invention teaches a system, device and method for jointly controlling the peak-to-average-ratio (PAPR) of multiple aggregated waveforms, out-of-band interference (OBI), and error vector magnitude (EVM).

In one aspect, the invention teaches a generating a next generation population of data points based on a common set of constraints such PAPR≤r that also satisfies OBI or EVM for a governing commercial standards such 3GPP LTE and IEEE 802.11 a/g/n. The invention uses a fitness value evaluated from a fitness function, wherein dependent upon PAPR, EVM, OBI values may be used to calculate the fitness function. The fitness value to generate a set of identifying indexes corresponding to data points nearer to a desired state value.

In yet another aspect, the invention teaches generating multiple sets of next generation/mutation indexes based on said fitness result of the fitness function comprising a PAPR calculator on the current population of primary and secondary users constrained by EVM and OBI limits for secondary user transmissions. The multiple sets of mutation indexes include a first set of mutation indexes comprising a set of $n_m$ number of indexed first signal samples corresponding to a subset of said set of indexed first signal samples $n_s$, wherein $n_m < n_s$, a second set of mutation indexes comprising a set of $x_m$ number of mutation indexes corresponding to a subset of said set of indexed second signal samples $x_s$, wherein $x_m < x_s$, a third set of mutation indexes comprising a set of $p_m$ mutation indexes corresponding to a subset of said set of indexed third signal samples $p_s$, wherein $p_m < p_s$, and a fourth set of mutation indexes comprising a set of $r_m$ mutation indexes corresponding to a subset said set of indexed fourth signal samples $r_s$, wherein $r_m \leq r_s$.

In yet another aspect of the invention, a data signal is received and sampled. The samples are indexed and organized in an initial population of aggregate waveforms comprised of primary and secondary users with at least one user having OFDM components operating as a DSA network. The aggregate waveforms are evaluated against characteristics common to all aggregate waveforms in the population such as OBI and EVM. The EVM may be a relative measure of self-interference of primary or secondary users 902 while OBI [1004 1008] may be a relative measure of the interference to other users sharing the band with primary or secondary users. The indexes corresponding to aggregate waveform with the desired fitness value are then subjected to further processing to produce a set of indexes used to construct a next generation population of aggregate waveforms which may produce more desired common characteristic results.

In still another aspect of the invention, out-of-bounds emissions in dynamic spectrum access (DSA) networking are controlled based on the PAPR metric. A method described herein operates on a collection of overlay and/or underlay signals of a DSA network having OFDM components. The method uses a fitness value to generate a set of identifying indexes corresponding to data points nearer to a desired state value.

BRIEF DESCRIPTION OF DRAWINGS

A more complete understanding of the present invention may be derived by referring to the various embodiments of the invention described in the detailed descriptions and drawings and figures in which like numerals denote like elements, and in which:

FIG. 9 is a graphical depiction of the in-band distortion of the received symbol constellation 902 after detection. An ideal linear amplifier would result is a perfectly received symbol constellation 904 in the absence of noise. EVM is the difference between a noise-free and distortion-less demodulated constellation 904 and the actual symbol constellation 902 impaired by in-band distortion from saturation of the amplitude. Amplifier drive levels are set according to average power of the input signal and clipping of the amplitude due to high peak amplitudes—i.e. PAPR.

FIG. 10 is a graphical depiction of the both the in-band spectrum 1002 and out of band spectrum 1004 of input signal to the power amplifier prior to the transmit antenna. Shown in FIG. 10 is the increase out-of-band energy after amplification by a non-linear amplifier compared to its input signal spectrum. The out of band energy is interference to other signal sharing the band; after amplification the adjacent channel power increases by 55−40=15 dB compared to a linear amplifier with the same gain from saturation of the amplitude. Amplifier drive levels are set according to average power of the input signal and clipping of the amplitude due to high peak amplitudes—i.e. PAPR.

DETAILED DESCRIPTION

Figure 1:
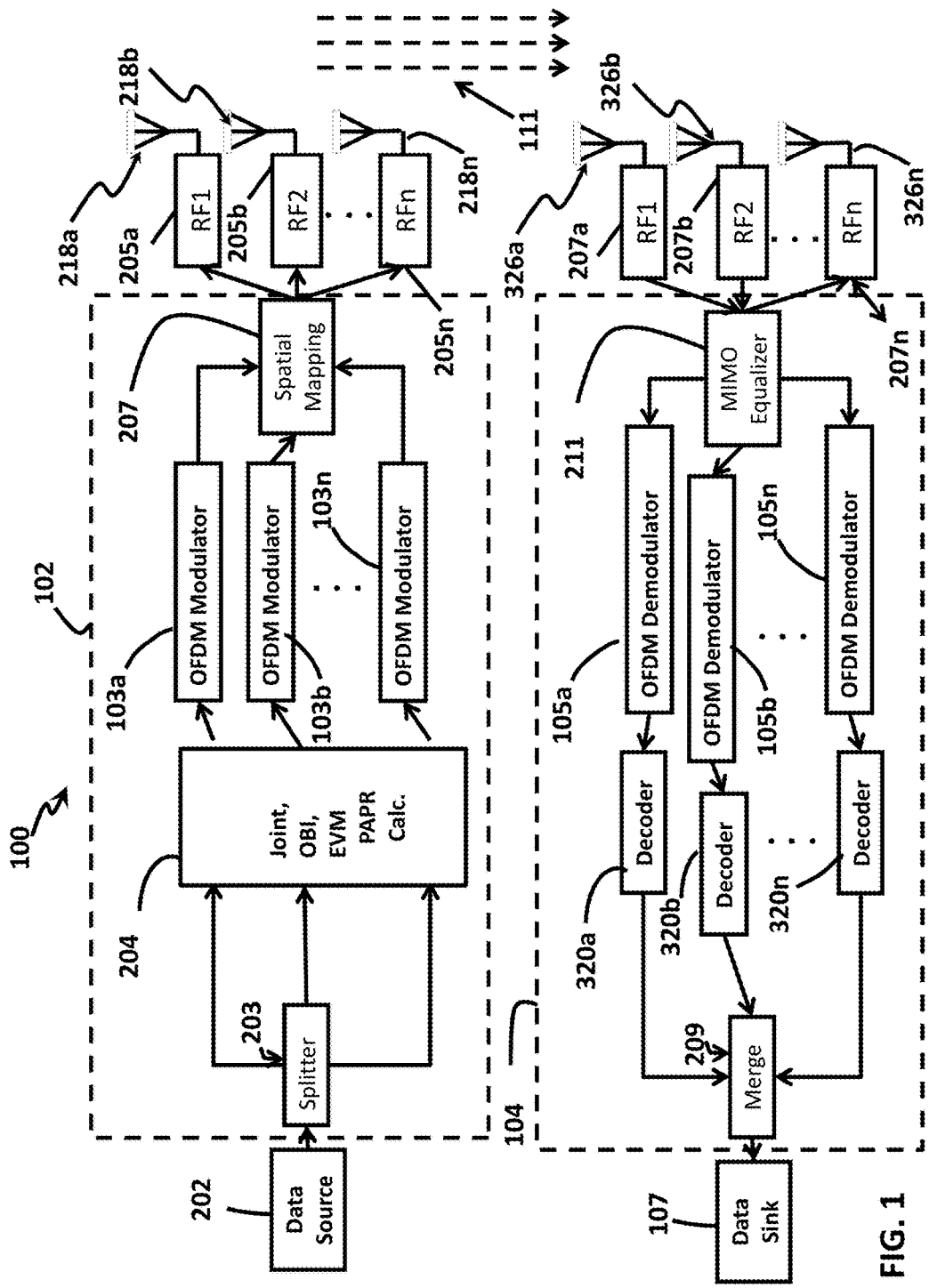
FIG. 1 is an exemplary MIMO wireless transmission system that may be used with the various embodiments of the invention.

The brief description of exemplary embodiments of the invention herein makes reference to the accompanying drawing and flowchart, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the description herein is presented for purposes of illustration only and not of limitation. For example, the steps recited in any of the method or process descriptions may be executed in any order and are not limited to the order presented.

The present invention may be described herein in terms of functional block components and various processing steps. It should be appreciated that such functional blocks may be realized by any number of hardware and/or software components configured to perform the specified functions. For example, the present invention may employ various integrated circuit (IC) components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like.

It should be appreciated that the particular implementations shown and described herein are illustrative of the invention and its best mode and are not intended to otherwise limit the scope of the present invention in any way. Indeed, for the sake of brevity; conventional wireless data transmission, transmitter, receivers, modulators, base station, data transmission concepts and other functional aspects of the systems (and components of the individual operating components of the systems) may not be described in detail herein. Furthermore, the connecting lines shown in the various figures contained herein are intended to represent exemplary functional relationships and/or physical couplings between the various elements. It also should be noted that many alternative or additional functional relationships or physical connections may be present in a practical electronic transaction or file transmission system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer readable storage medium having computer-readable program code means embodied in the storage medium. Any suitable computer-readable storage medium may be utilized, including hard disks, CDROM, optical storage devices, magnetic storage devices, and/or the like.

In various embodiments, the invention may comprise, or be implemented as, a computer system, a computer subsystem, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station, a radio network controller (RNC), a mobile subscriber center (MSC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof.

To simplify the description of the exemplary embodiment, the invention is described as pertaining to a MIMO system. However, the invention is applicable to SISO and DSSS systems and any multi-dimensional transmission protocol. It will be appreciated that many applications of the present invention could be formulated. For example, the system could be used to facilitate any conventional wireless communication medium, and the like. Further, it should be appreciated that the network described herein may include any system for exchanging data or transacting business, such as the Internet, an intranet, an extranet, WAN, WLAN, WPAN, Ad hoc Networks, mobile ad hoc networks (MANET), satellite communications (SATCOM), and/or the like.

FIG. 1 is an exemplary block diagram of a MIMO system 100 useful with the invention. The exemplary MIMO communication system 100 and its sub-components will be described below when required to facilitate the description of the present invention. The exemplary MIMO communication system 100 may be implemented as a wireless system for the transmission and reception of data across a wireless channel 111. For example, the MIMO communication system 100 may be implemented as part of a wireless local area network (LAN) or metropolitan area network (MAN) system, a cellular telephone system, or another type of radio or microwave frequency system incorporating one-way or two-way communications over a range of distances.

MIMO communication system 100 may employ various signal modulation and demodulation techniques, such as single-carrier frequency domain equalization (SCFDE) or orthogonal frequency division multiplexing (OFDM), for example. However, throughout this description, references will be made with respect to a MIMO communication system or a system including a transmitter and receiver merely to facilitate the description of the invention.

MIMO communication system 100 includes a transmitter 102 and a receiver 104. The transmitter 102 transmits signals across the channel 111 to the receiver 104. The transmitter 102 may include a signal splitter for spitting data source 202, and an encoder (not shown) for encoding the signals. The peak-to-average-power-ratio (PAPR) of each signal may then be calculated at, for example, multidimensional PAR calculator 204. Multi-dimensional PAPR calculator may take the randomly produced indexed samples in the initial population and evaluate the initial population under a pre-determined criterion. If the initial population of indexed samples meets the criteria, multi-dimensional PAPR calculator 204 may generate a next generation population of indexes for further processing. If the initial population of sampled indexes does not meet the criteria, then the next generation indexes are used to generate a next population of sampled indexes which are constrained by the mapping of the PAPR vector of the selected indexed samples onto the fitness function. The next generation of indexes is therefore constrained by the fitness function to ensure that the next generation samples are reduced over the initial population. Each signal may then be modulated 103, then spatially mapped at spatial mapper 207 prior to being transmitted to the receiver 104 by antenna 218a. 218b, and 218n. Such signals may alternatively be referred to collectively as a "data source," "data," "signals," "information sequence," and/or "data signals."

The signal is received at the receiver antenna 326a, 326b, and/or 326n and MIMO equalizer 211 receives the signal. MIMO equalizer 211 equalizes any inter-channel interference and the mixed signals, typically received from more than one transmit antenna. The receiver 104 may include a demodulator 105a, 105b, 105c, which receives the received signals from MIMO equalizer 211. Demodulator 105a, 105b, 105c may demodulate the signals and provide the signals to decoder 320a, 320b, 320c. Decoder 320a, 320b, 320c typically combines and decodes the demodulated signals from the demodulator 105a, 105b, 105c. In this regard, the decoder 320 typically recovers the original signals that were provided by the data source 202. As depicted in FIG. 1, the original signals recovered by the decoder 320a, 320b, 320c may be merged and transmitted to a connected data sink 107, Data sink 107 may include one or more devices configured to utilize or process the recovered signals.

Figure 2:
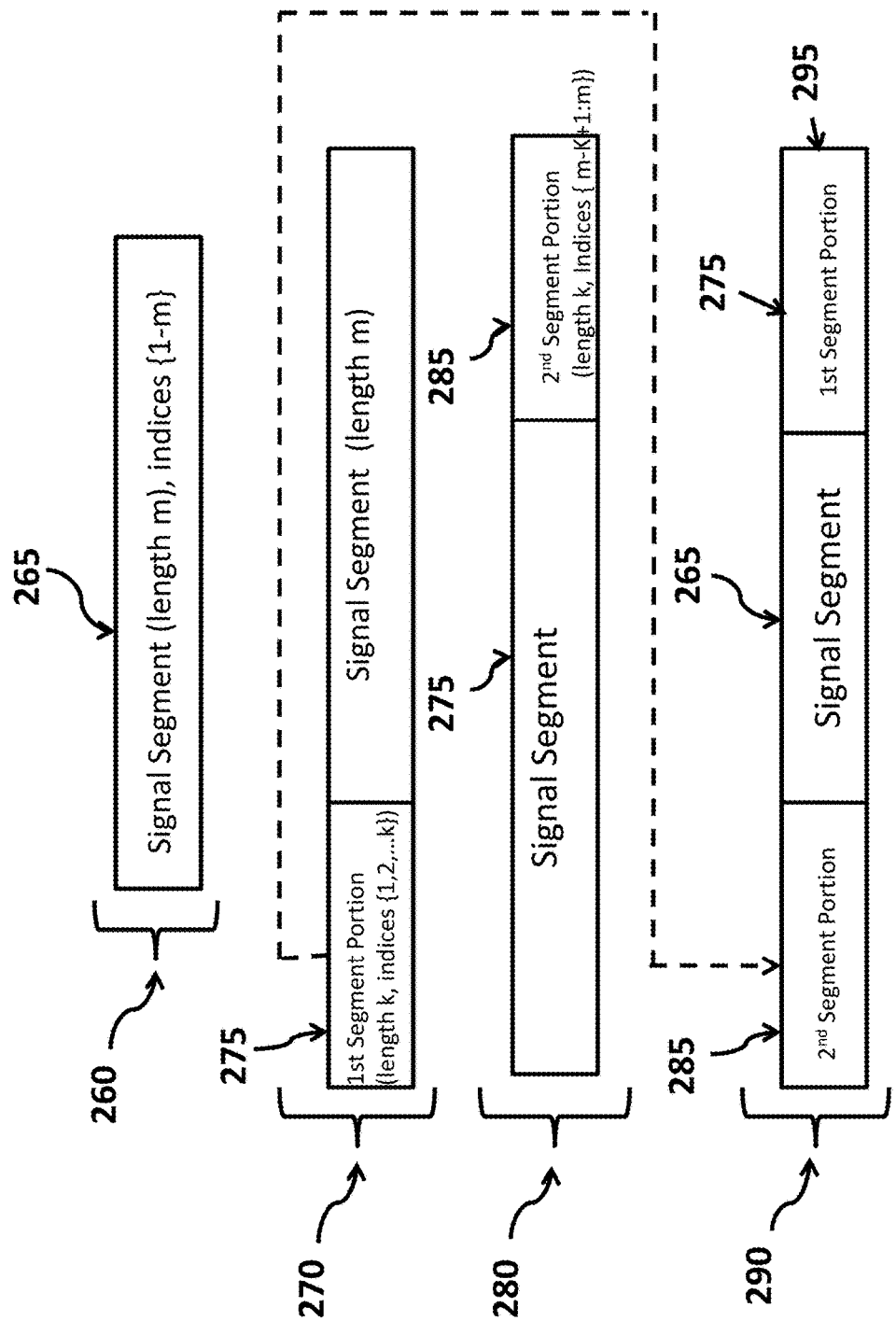
FIG. 2 is an exemplary method for generating an augmented segmented signal, in accordance with various embodiments of the invention.

FIG. 2 depicts an example of the signal processing performed for preparing a data signal (e.g., data source 202) for PAPR optimization. During signal processing, a data signal 202 (data source 202) is sampled. The samples may also be sequentially indexed. Periods of samples may be organized into groups, collections, segments or the like. By repeating the process of FIG. 2, a population of indexed samples may be generated. The first instance of sampling may serve as an initial population for evaluation and optimization of a signal characteristic, such as the peak-to-average-power-ratio, as will be described more fully. In the exemplary embodiments discussed herein, to facilitate understanding, the group of samples is described as "segment," "indexed segment," "indexed samples" interchangeably.

Step 260 teaches that data signal 202 may be sampled into a signal segment 265, of length m samples, which may be indexed {1:m}. At step 270, a first segment portion 275 of length k samples may be determined from indexed samples 1 through k where the samples are taken from signal segment 265. Similarly, at step 280, a second portion of segment 265 (second segment portion 285) of length m-k may be generated from indexed samples m-k+1:m samples. Finally, at step 290, an augmented segment 295 may be generated. Augmented segment 295 may be generated by pre-pending second segment portion 285 to signal segment 265 (cyclic-prefix), and further appending section 285 to signal segment 265 (cyclic-suffix). As such, each augmented segment may include (m+2k) total indexed samples.

In a particular example, multiple augmented segments may be generated from data signal 202. Additionally, multiple "augmented segment streams" may be generated from each "augmented segment." The augmented segment streams may be generated using the method of FIG. 2 described above. In this context, an augmented segment stream may be samples taken from data signal 202. Segment 265 may be used for forming the augmented segment. Signal segment 265 may be comprised of indexed samples that may be ordinally shifted from a first indexed sample (e.g., sample 1) to a different indexed sample $x \neq \#1$. As is understood by one skilled in the art, an augmented segment stream may be an alternate representation of the augmented segment from which it is generated using a cyclic time shift, for example. For example, a first augmented segment stream generated using the processing of FIG. 2 may be an alternate representation of augmented segment 295. Further still, it should be noted that where an augmented segment is used to generate multiple augmented segment streams, each of the augmented segment streams may be an alternate representation of the augmented segmented from which it is generated. Additionally, each aggregate waveform is constructed of indexed samples mutually exclusive from the indexed samples used for constructing other aggregated waveforms in the collection. More particularly, the indexed samples used to construct an augmented segment are unique.

To facilitate description of augmented segments and augmented segment streams, an augmented segment may be described as augmented segment 1, and a first augmented segment stream of augmented segment 1 is denoted augmented segmented stream 1-1. A second augmented segment stream of augmented segment 1 is denoted augmented segment stream 1-2, and the nth augmented segment stream of augmented segmented 1 is augmented segment stream 1-nth. Similar naming convention is used with respect to augmented segment 2, which may have a first augmented segment stream 2-1, a second augmented segment stream 2-2, and an nth augmented segment stream 2-nth.

Figure 3:
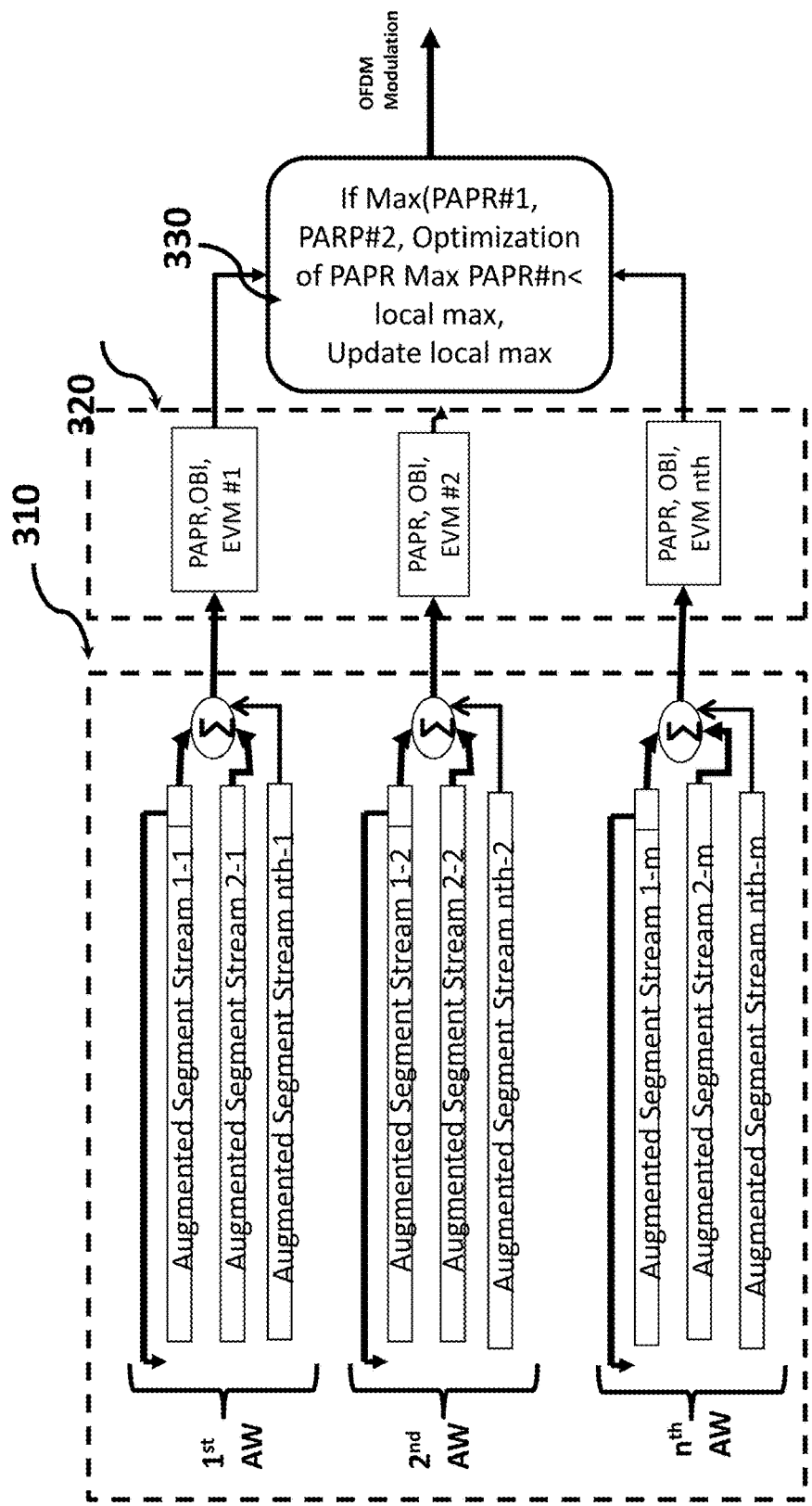
FIG. 3 is an exemplary method for reducing PAPR for an initial population in accordance with various embodiments of the invention.

As used herein, an "aggregate waveform" may be a combination of augmented segment streams. The augmented segment streams forming the aggregate waveform may be generated from the same augmented segment, or from multiple augmented segments. FIG. 3 shows the generation of multiple aggregate waveforms, $1^{st}$ AW, $2^{nd}$ AW and nth AW. As is shown, aggregate waveform $1^{st}$ AW may comprised of multiple augmented segment streams. More particularly, aggregate waveform $1^{st}$ AW may be comprised of multiple like numbered augmented segment streams from the multiple augmented segments. By "like numbered" what is meant is that all like numbered augmented segment streams of different augmented segments are combined to form an aggregate waveform. In some instances, where an augmented segment does not have a like numbered stream the aggregated waveform formed may not include the missing like numbered augmented segment stream.

The example shown in FIG. 3 is a schematic of a method for generating an initial population 310 of signal samples. In the instance shown, the initial population consists of aggregate waveforms, for which the PAPR must be optimized. Initial population 310 may include multiple aggregate waveforms, which may be considered a collection of aggregate waveforms 310.

As illustrated in FIG. 3, $1^{st}$ AW is constructed by combining the first streams from each augmented segment generated, for example, using the method of FIG. 2. Aggregated waveform $1^{st}$ AW comprises stream 1 of a first augmented segment (i.e., augmented segment stream 1-1) and a stream 1 of a second augmented segment (i.e., augmented segment stream 2-1). Aggregated waveform $1^{st}$ AW may include additional augmented segment streams, such as, a stream 1 of an $n^{th}$ augmented segment (i.e., augmented segmented stream $n^{th}$-1).

The aggregate waveforms $2^{nd}$ AW and $n^{th}$ AW in the collection of aggregate waveforms 310 are generated similarly to as what is described with respect to aggregated waveform $1^{st}$ AW. Namely, aggregated waveform $2^{nd}$ AW comprises stream 2 of a first augmented segment (i.e., augmented segment stream 1-2) and a stream 2 of a second augmented segment (i.e., augmented segment stream 2-2). Aggregated waveform $2^{nd}$ AW may include additional augmented segment streams, such as, a stream 2 of an $n^{th}$ augmented segment (i.e., augmented segmented stream $n^{th}$-2).

Further, an aggregated waveform $n^{th}$ AW comprises stream $n^{th}$ of a first augmented segment (i.e., augmented segment stream 1-$n^{th}$) and a stream $n^{th}$ of a second augmented segment (i.e., augmented segment stream 2-$n^{th}$). Aggregated waveform $n^{th}$ AW may include additional augmented segment streams, such as, a like numbered stream of an augmented segment (i.e., augmented segmented stream $n^{th}$-1) in the collection of aggregate waveforms.

As noted above, collection of aggregated waveforms 310 may be viewed an initial population 310 of sampled data signals for which some population characteristics—such as PAPR, EVM, OBI—are evaluated. The initial population may be processed or manipulated to prepare it for later processing, such as, PAPR optimization and EVM and OBI reduction. Referring again to FIG. 3, the PAPR, EVM, OBI of the initial population 310 may be calculated by evaluating the PAPR, EVM, OBI of the aggregate waveforms in the collection of aggregate waveforms 310. For example, the aggregate waveform $1^{st}$ AW PAPR, EVM, OBI PAPR may be calculated from the combined PAPRs, EVMs, OBIs of each augmented segment stream comprising the aggregated waveform $1^{st}$ AW of a primary or secondary user. Specifically, the PAPR, EVM, OBI of aggregated waveform $1^{st}$ AW may be calculated from the PAPRs, EVMs, OBIs of augmented segment stream 1-1 of a primary or secondary user, augmented segment 2-1 of a primary or secondary user, and augmented segment stream $n^{th}$-1 of a primary or secondary user, etc. The PAPR, EVM, OBI of each aggregated waveform (e.g., 2 AW PAPR, EVM, OBI, nth AW PAPR, EVM, OBI) in the collection is likewise calculated.

The PAPRs, EVMs, OBIs for the different aggregated waveforms may be calculated using separate dedicated PAPR, EVM, OBI calculators 320. FIG. 3 depicts a PAPR, EVM, OBI #1 calculator for calculating PAPR, EVM, OBI of $1^{st}$ AW. PAPR, EVM, OBI #1 provides the PAPR, EVM, OBI for $1^{st}$ AW to be further processed at, for example a PAPR, EVM, OBI comparator and optimizing process 330. Similarly, PAPR, EVM, OBI #2 calculator provides the PAPR, EVM, OBI for $2^{nd}$ AW to be further processed, and PAPR, EVM, OBI #$n^{th}$ calculator provides the PAPR, EVM, OBI for $n^{th}$ AW to be further processed. During processing, the PAPRs, EVMs, OBIs of each aggregate waveform are evaluated. The PAPRs, EVMs, OBIs is optimized prior to transmitting the aggregate waveform to a receiver.

In one aspect, the present invention teaches a system and method for controlling multidimensional peak-to-average-power-ratio (PAPR), out-of-band interference (OBI) and error vector magnitude (EVM) resulting from combining multiple augmented segments streams. The methods found in the prior art are deficient in that prior PAPR methods are not guided by constraints on OBI and EVM on other primary or secondary users. For example, prior methods only evaluate new populations without guidance, such that the next generation indexing is not assured to have a reduced PAPR and OBI and EVM.

In another aspect, the present invention makes use of the indexes for samples in the initial population 310 to select the indexes for a next generation of aggregated waveforms with a reduced PAPR. What "next generation" may refer to are the collections, groups, segments of samples generated based on any prior "parent" or "initial" population. For example, a next generation of aggregate waveforms may be generated based on information related to the parent aggregated waveforms from the initial population. In an exemplary embodiment of the invention, the samples that create the initial population and the next generation population may be identified by their corresponding indexes. The samples form in the next generation may be less in number or in value than the samples forming the initial or parent population. What this may mean is the next generation indexes are a subset of the indexes for the initial population samples. Thus, the samples corresponding to the next generation indexes are a subset of the samples in the initial population. In one exemplary embodiment, the next generation indexes are used to identify the samples in the next generation aggregated waveforms with reduced PAPR over the aggregated waveforms generated from the initial population.

Figure 4:
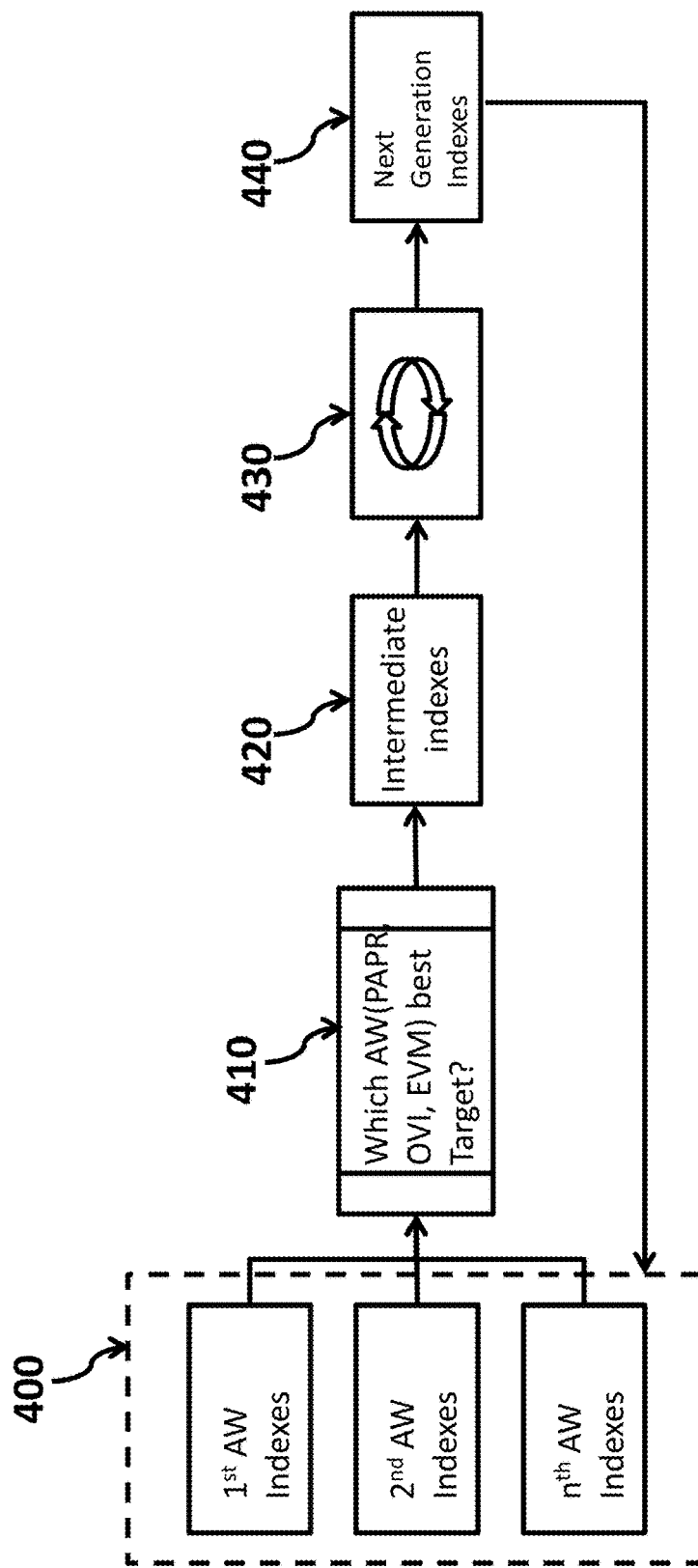
FIG. 4 is an exemplary schematic of a method for generating next generation population with reduced PAPR in accordance with various embodiments of the invention.

FIG. 4 is a block diagram of an exemplary method for generating the next generation indexes in accordance with the present invention. In one particular embodiment, only the indexes related to a single aggregate waveform are considered when generating the next generation indexes. For example, when the PAPRs, EVMs, OBIs related to multiple aggregate waveforms are evaluated, the indexed samples related to the aggregate waveform having the highest PAPR value and/or lower OBI and EVM are the basis for forming the next generation indexes. For ease in understanding, we will refer to the indexes related to the aggregated waveform with the suitable PAPRs, EVMs, OBIs as the set of "intermediate indexes."

The initial population of indexes 400 consists of all indexes related to each aggregated waveform in the population. The initial population of indexes 400 may be organized according to the aggregated waveforms included in the population. The PAPR, EVM, OBI of each aggregate waveform is evaluated to determine which aggregate waveform has the highest PAPR and/or lower OBI and EVM (step 410). The indexes forming the selected aggregated waveform make up the intermediate indexes at step 420.

The intermediate indexes may then be subjected to further processing (step 430). The additional processing may mean the intermediate indexes are subjected to a genetic algorithm and/or fitness function for producing a fitness value. In this context, a fitness value serves as constraint upon the processing at step 430. For example, typical constraints that may be placed on the processing include timing offset errors, frequency offset errors, amplitude distortions (both in-band and out-of-band) or channel estimation errors as are found in the prior art. In another example, the processing may mean that the intermediate indexes undergo integer programming, updated state vectors such as with control systems described by a Kalman Filter process. In still another embodiment, the processing at step 430 results in next generation indexes for forming a next generation population. In yet another embodiment, the processing at step 430 results in next generation indexes used to identify the samples for next generation aggregated waveforms having a reduced PAPR and/or lower OBI and EVM.

Figure 5:
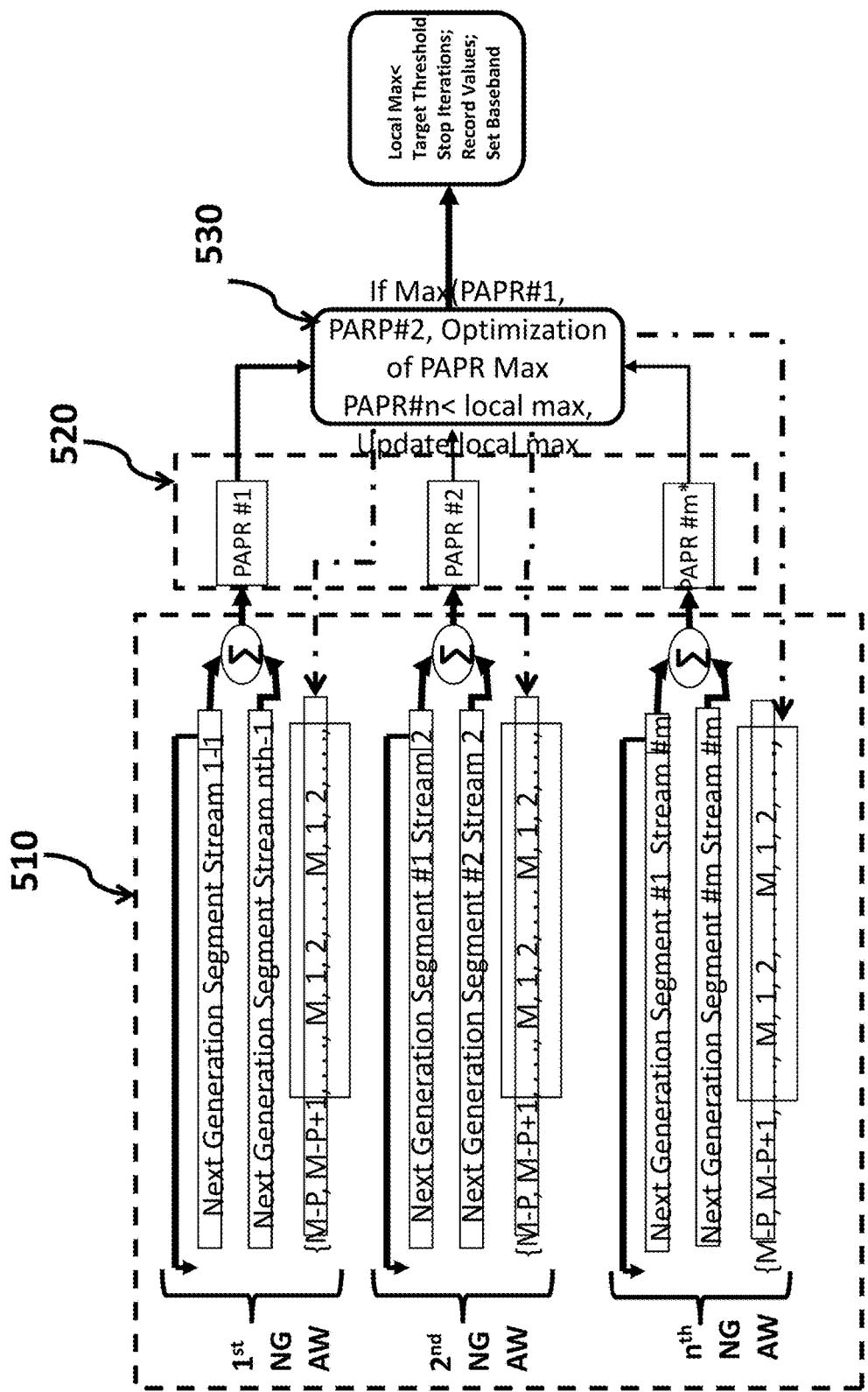
FIG. 5 is an exemplary flowchart of a method for reducing PAPR in accordance with various embodiments of the invention.

FIG. 5 illustrates an exemplary method for how the next generation indexes may be used to construct a next generation population of indexed samples 510. Next generation population 510 is shown comprising next generation aggregate waveforms $1^{st}$ NG AW, $2^{nd}$ NG AW, $n^{th}$ NG AW. Each next generation aggregate waveform is constructed using the next generation indexes 440. For example, the next generation indexes are organized such that samples are identified for each next generation segment. The identified next generation segments are used to construct augmented next generation segments using for example the method in FIG. 2. Alternate representations of the next generation augmented segment are formed as augmented next generation segment streams. For example, $1^{st}$ NG AW is comprised of next generation segment stream 1-1, a using similar convention as is discussed above with respect to initial population 310.

As is noted, the next generation indexed samples may be a subset of the indexed samples used to construct the initial population. In similar manner as was discussed above, each next generation stream is an indexed shifted representation of next generation segment. Namely, next generation segment stream 1-2 is a shifted representation of next generation segment stream 1-1. Further still, each aggregate waveform is comprised of like numbered streams from each next generation segment, where the next generation segment is generated based on intermediate indexes. With continued reference to FIG. 5, the next generation population includes multiple next generation segments, the individual streams of which comprise the next generation aggregate waveforms. At step 520, the target characteristic of each next generation aggregate waveform is evaluated. For example, the PAPR, EVM, OBI of each next generation aggregate waveform is determined. The PAPR, EVM, OBI of each next generation aggregate waveform is calculated from the combination of PAPRs, EVMs, OBIs of each next generation segment stream. Each individual set of PAPR, EVM, OBI is then evaluated against the target value at step 530. The optimization of the PAPR, EVM, OBI may be any traditional PAPR optimization method and EVM/OBI reduction methods. As shown in step 530, in one example shown as a fitness evaluation function computing the PAPR max while minimizing EVM and OBI. The PAPR, EVM, OBI vectors are mapped onto the fitness value function. Where the PAPR, EVM, OBI does not meet the target value, a further next generation of indexes is generated with respect to FIG. 4. Particularly, a further next generation of indexes is generated, where the further generated indexes correspond to samples that provide an even further reduced value relative to the target value. In one embodiment, the further generation indexes correspond to samples with an even further reduced PAPR and lower EVM and OBI than from clipping the initial population.

Additionally, next generation samples generated based on said next generation indexes meet at least one regulatory emission criterion of the governing regulatory body of the country in which the device operations. Further still, the next generation samples generated in according to this invention are receivable by a receiver for demodulating and decoding separately each constituent protocol stream of said next generation sample without requiring additional information to be transmitted outside of said protocols. The next generation sample contains an alternate representation of a constituent protocol stream component that differs from the constituent protocol stream in a cyclic time shift, wherein the alternate representation of the constituent protocol stream is generated based on a characteristic of the constituent protocol stream. Further still, the alternate representation of the constituent protocol stream meets a regulatory emission criterion of the governing regulatory body (e.g., IEEE, ETSI, etc) of the country in which a transmitter transmitting said alternate representation operates.

In dynamic spectrum access (DSA) networks that consider different degrees of interaction between primary users and secondary users, it is desired to control out-of-bound interference (i.e., "emissions") between primary users' transmissions and secondary users' transmissions. In DSA networks including underlay transmission, secondary users may communicate with each other as long as the interference created to the primary user is below some predefined threshold. In this case, the secondary users not only assess whether primary users are transmitting but also how much interference or emissions they will create and whether this will disrupt the primary user's transmission. In a DSA network having overlay transmissions the primary user and the secondary user are permitted to communicate in a cooperative fashion. In any DSA network including underlay transmission and the overlay transmissions, or in DSA networks having a combination of overlay and underlay networking, it is necessary to assess the impact of the presence of secondary users on primary user transmissions for total efficient transmission.

In yet another embodiment, next generation samples generated based on next generation indexes meet at least two regulatory emission criteria of the governing regulatory body of the country in which the device operations and at least one next generation samples abides by principles of dynamics spectrum access of the governing regulatory body. The term "dynamic spectrum access" has broad connotations in spectrum and regulatory body communities to encompass various approaches to spectrum reform. One such reform of interest related to the present invention is the category of Hierarchical Access Model, based on primary and secondary users. The present invention can be used to provide guidance in selection of "secondary user operation." Typical examples of secondary user operations involve controlling out-of-bounds emissions or interference based on the composite PAPR of a transmitting station engaged in concurrent primary user and secondary user operations. In this instance, "concurrent" may mean that the primary user stream and the secondary stream are transmitting simultaneously out of the same antenna structure. The "composite PAPR" is calculated using signals from each primary user and secondary user and calculating a total PAPR for the collection of primary and secondary users. Secondary user operations include secondary user transmissions in a dynamic spectrum access network (DSA). Overlay signal transmissions and underlay signal transmissions are examples of secondary user transmissions found in DSA networks, which can be controlled based on evaluation of the composite PAPR and one other constraint according to this invention.

The initial population may be constructed from a pool of primary users sharing the spectrum with secondary users using either in spectrum underlay or spectrum overlap technique. The underlay approach imposes severe constraints on the transmission power of the secondary users to operate below the noise floor of the primary users. In contrast, spectrum overlay approach does not necessarily impose severe restrictions on the transmission power of the secondary but rather on when and where they may transmit. Both approaches can impact the overall interference and PAPR of the next generation population. Therefore, fitness value can serve as a constraint for each next generation stream comprised of secondary users lead to next generation aggregated waveforms having a reduced PAPR and/or reduced interference for all primary and secondary users being transmitter from a common radio.

In an exemplary method for controlling out-of-band interference using the composite PAPR for a collections of overlay and/or underlay signals of a dynamic spectrum access (DSA) network having OFDM components in a DSA network according to this invention, includes transmitting overlay signals or underlay signals as secondary users common with existing primary users; indexing said overlay signals or underlay signals; evaluating total out-of-band interference resulting from the composite PAPR of said indexed overlay signals or underlay signals with existing primary users; preparing a fitness result based on said evaluation; subjecting said fitness result to algorithmic process to generate a next generation index; wherein one example of an algorithmic process is the generation of a sparse clipped amplitude vector and whose indexes of the nonzero values form next generation indexes; preparing a next generation data sample based on said next generation indexes, the composite PAPR of said next generation data sample being less than said composite PAPR for the collection of overlay and/or underlay signals and total out-of-band interference of said indexed next generation data sample, wherein said indexed next generation sample conforms to at least one independent international standard, wherein said indexed next generation sample is receivable by a receiver for demodulating and decoding separately each primary and secondary stream of said next generation sample without requiring additional information to be transmitted outside of said protocols, and wherein said calculation of said PAPR and total out-of-band interference of each primary and secondary streams result in a lower composite PAPR and total out-of-band interference for every primary and secondary stream of the collection.

Figure 6:
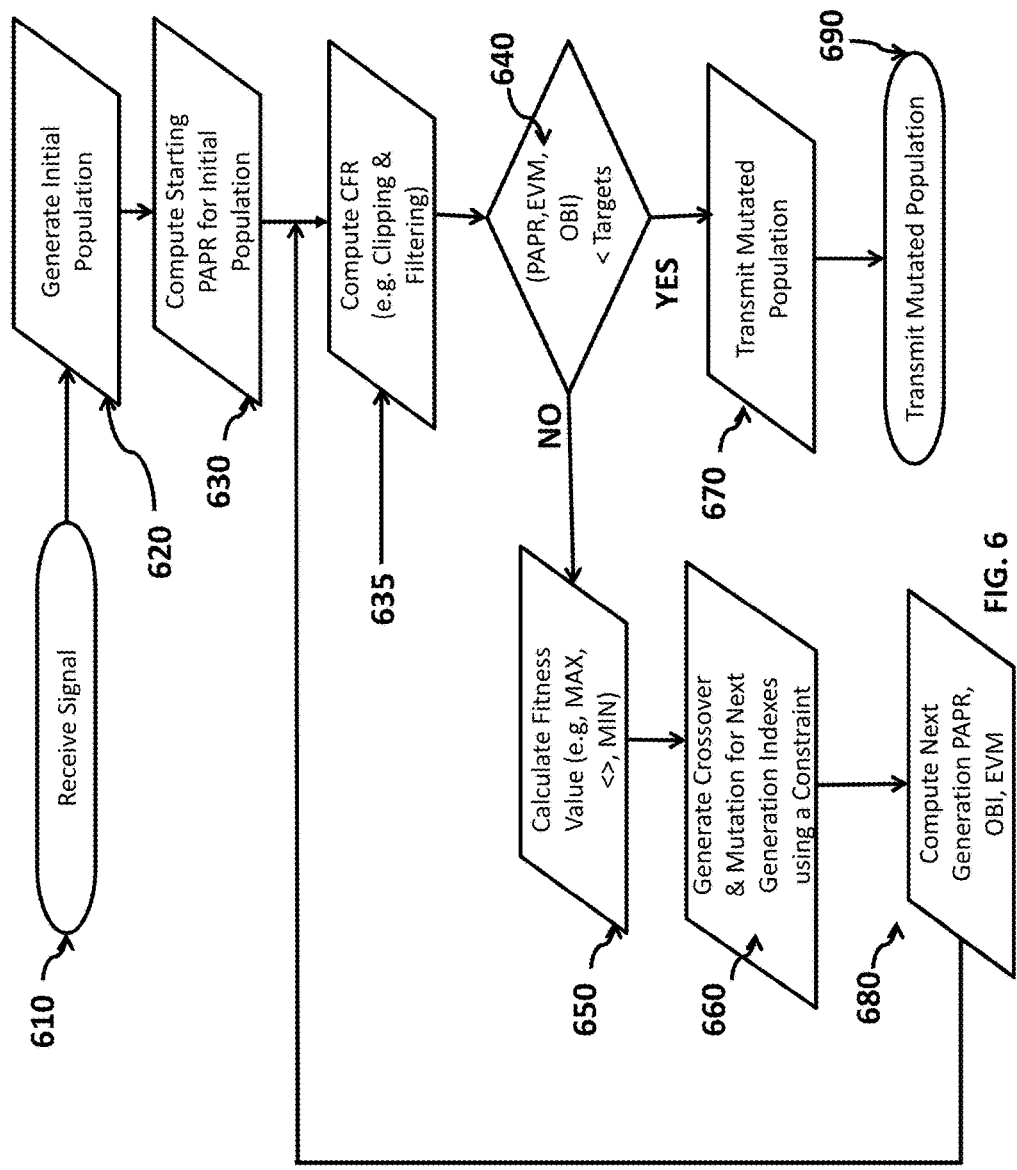
FIG. 6 is an exemplary embodiment of second generation aggregated waveform with reduced PAPR.

FIG. 6 is yet another embodiment of an exemplary method for generating a next generation population according to the present invention. At step 610, a signal is received from a data source. The data source is sampled to generate an initial population of data points (e.g., step 620). A characteristic of the data signal is evaluated against a targeted or desired value. In the example shown, the initial population PAPR is calculated (step 630) and evaluated against a target PAPR. Crest factor reduction (635) such as clipping increases the EVM and OBI but further reduces PAPR. If the initial population PAPR, EVM, OBI of the initial population does not meet the targeted PAPR, EVM, OBI (step 640), a fitness value is determined (step 650) that is used to generate next generation indexes (step 660). The next generation indexes are computed using the fitness value and added constraints on EVM and OBI. In one embodiment, the constraints on EVM and OBI entails subtracting a variable number of nonzero values of a sparse vector containing the clipped amplitudes to the population greater than the targeted PAPR. The next generation indexes identify the data source samples of the sparse aforementioned "clipping vector" to form a mutation or iteration of the initial population space (step 680). The next generation population is formed using data source samples of the sparse clipping vector which are nearer to the targeted value. In the example shown, the next generation PAPR, EVM, OBI is evaluated against the targeted or desired PAPR, EVM, OBI (step 640). The process of generating a next generation population may be repeated until the generated next generation PAPR, EVM, OBI meets the targeted value (step 640). In this context, by meeting the targeted value, what is meant is that the measured value is within a predetermined range or tolerance. Once the measured value is within the predetermined tolerance, the population of data points (e.g., transmuted population) identified by the indexed samples meeting the target are forwarded for transmission (step 670). For example, the indexed samples may be forwarded for other processing for radio frequency transmission (step 690).

Figure 7:
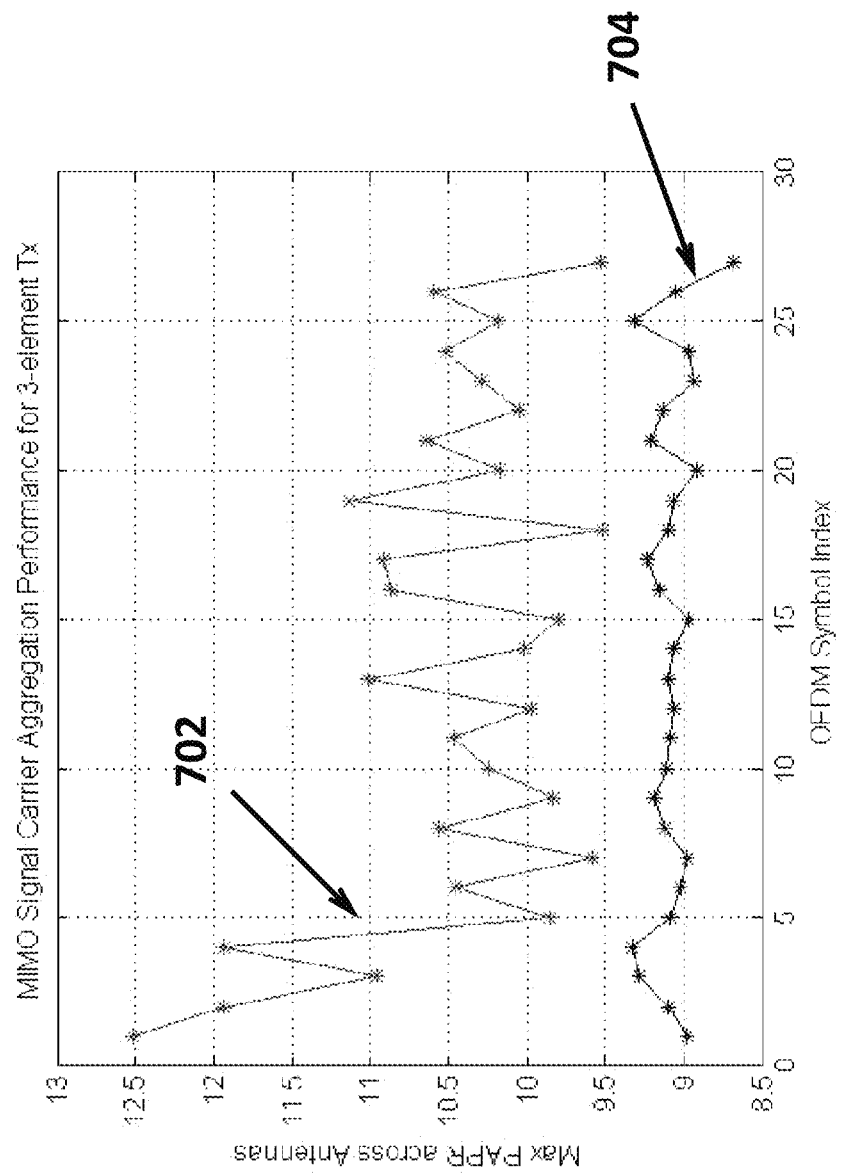
FIG. 7 is a graphical example of the results of the operation of the invention showing a reduced PAPR 704 when the next generation of indexes is constrained to no or negligible EVM in accordance with the present invention.
Figure 8:
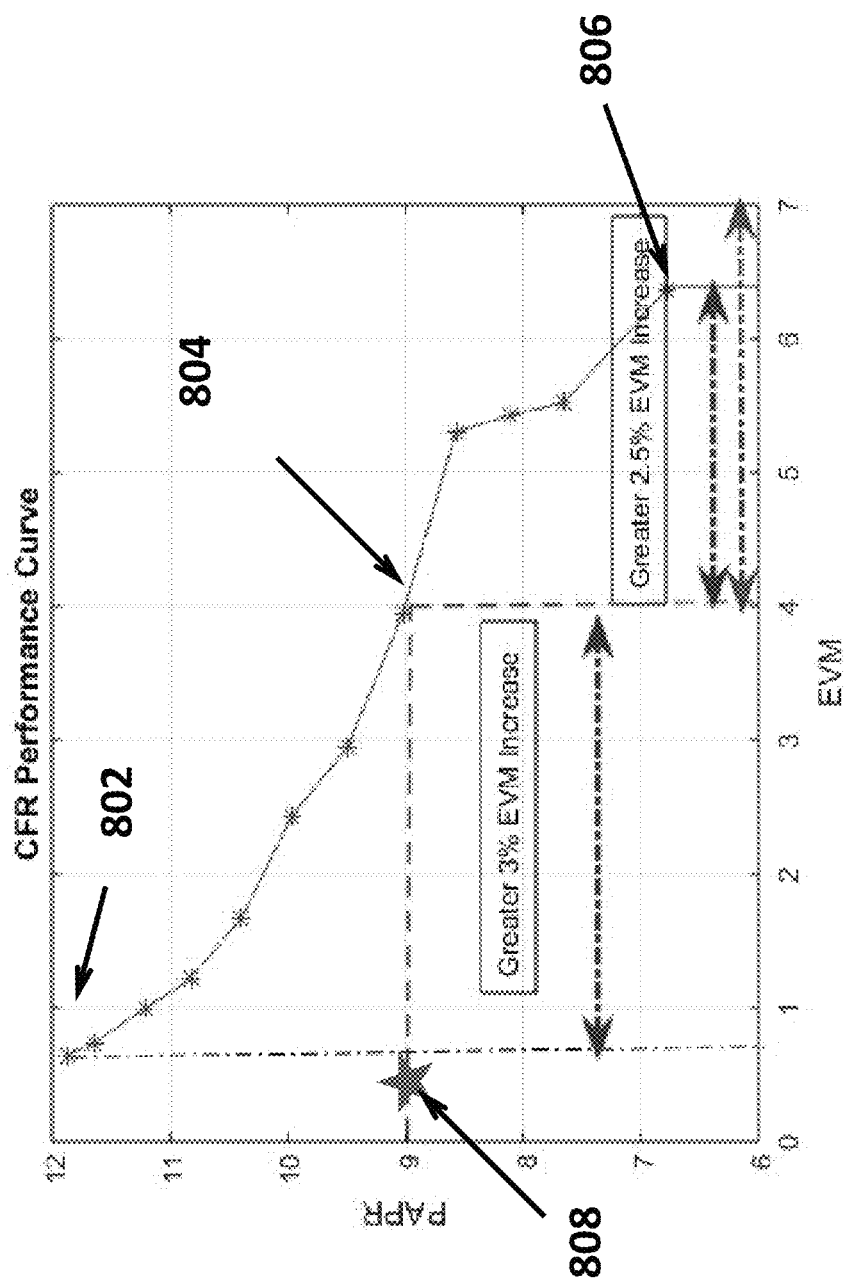
FIG. 8 is a graphical example of the results of the operation of the invention showing further reduced PAPR 808 when the next generation of indexes is constrained to allow incremental OBI and EVM distortions in accordance with the present invention.

FIG. 7 is an illustrative graph illustrating the effectiveness of the present invention. The graph shown is an example using multi-user MIMO code vector. The graph illustrates the optimization of a particular characteristic, such as PAPR, over an initial population of data samples. The target PAPR for the MIMO system is 9 dB. The graph shows MAX PAPR performance for data samples evaluated over 27 OFDM data symbols. This example shows a joint optimization with a spatial criterion over the collective. [0066] As shown, the MAX PAPR is calculated for data samples at each data symbol. Graph 702 illustrates techniques which MAX PAPR over a randomly selected data samples. As can be seen, MAX PAPR values for graph 702 are unpredictable relative to previously selected data samples. That is, MAX PAPR values may become closer to the target value at an OFDM Symbol, but become much farther away at other later OFDM symbols. Specifically, there are no limitations placed on which data samples should be successively selected to ensure that the MAX PAPR calculations of subsequently selected data samples are nearer to the target PAPR. As shown in graph 702, the MAX PAPR does not converge to the targeted PAPR of 9. dB (+/−0.5 dB) over 27 OFDM data symbols.

On the other hand, graph 704 shows the result of operation of the present invention on the same data signals. As shown, when the initial population of data samples is optimized under the present invention, the PAPR of the samples converge to at or near the target PAPR. The present invention evaluates the MAX PAPR of the initial population samples at each OFDMS. However, each subsequent sample set evaluated is further constrained. For example, the subsequent samples chosen are identified based on the previously evaluated data samples. As such, the PAPR of subsequently selected data samples is further reduced with each iteration of the method of the present invention that is performed. That is, over the 27 OFDM data signals illustrated, the MAX PAPR converges or near converges to the targeted PAPR of 9. dB (+/−0.5 dB). That is, subsequent sample sets that are evaluated are constrained to marginalize the unpredictability of the total MAX PAPR over the entire population.

It should be appreciated by one skilled in art, that the present invention may be utilized in any device that implements the OFDM encoding scheme. The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for controlling out-of-band interference using the peak-to-average-power ratio (PAPR) for a collections of secondary user transmissions of a dynamic spectrum access (DSA) network having OFDM components in a DSA network, comprising:
transmitting the secondary user transmissions concurrent with primary user transmissions;
indexing said secondary user transmissions;
evaluating total out-of-band interference based on a PAPR distortion of said indexed secondary user transmissions concurrent with primary user transmissions;
preparing a fitness result based on said evaluation of said out-of-band interference;
subjecting said fitness result to algorithmic process to generate a next generation index;
preparing a next generation data sample based on said next generation indexes, a PAPR of said next generation data sample being less than said PAPR of said indexed next generation data sample, wherein said next generation sample conforms to at least one independent international standard, wherein said indexed next generation sample is receivable by a receiver for demodulating and decoding separately each primary and secondary stream of said indexed next generation sample without requiring additional information to be transmitted outside of said protocols, and wherein a calculation of said PAPR and said total out-of-band interference of each concurrent primary streams and secondary streams results in a reduced total out-of-band interference for every primary stream and secondary stream of the collection.

2. The method according to claim 1, wherein said indexed next generation sample comprises multiple primary and secondary streams, wherein said next generation sample conforms to at least one independent international standard, wherein said next generation sample is receivable by a receiver for demodulating and decoding separately each constituent protocol stream of said next generation sample without requiring additional information to be transmitted outside of said protocols.

3. The method according to claim 2, further comprising calculating the composite PAPR for all primary and secondary stream, wherein said calculation of said composite PAPR of all primary and secondary stream results in a lower composite PAPR and reduce interference for all primary and secondary users.

4. The method according to claim 3, wherein said next generation sample contains an alternate representation of a primary or secondary stream, said alternate representation of said primary or secondary stream differing from said primary or secondary stream in a cyclic time shift, wherein said alternate representation of said primary or secondary stream is generated based on a characteristic of said primary or secondary stream.

5. The method according to claim 3, further comprising performing the algorithmic process in iterative steps, wherein each iterative step results in the lowering composite PAPR or equal composite PAPR of the previous iteration for all primary and secondary stream, and terminating the algorithmic process for composite PAPR calculations below a targeted threshold.

6. The method according to claim 4, wherein said alternate representation of said primary and secondary stream meets a regulatory emission criterion of the governing regulatory body of the country in which a transmitter transmitting said alternate representation operates.

7. The method according to claim 1, wherein the algorithmic process outputs a set of parameters to a transmitter subsystem for producing equivalent radio frequency representations of the next generation sample.

8. The method according to claim 1, wherein the secondary user transmissions are one of a underlay transmission and an overlay transmission.

9. A method for reducing in-band distortion resulting from clipping in crest factor reduction (CFR) algorithms as quantified by error vector magnitude (EVM) figure of merit, and controlled using the peak-to-average-power ratio (PAPR) for a collections of secondary user transmissions of a dynamic spectrum access (DSA) network having OFDM components in a DSA network, comprising:
transmitting the secondary user transmissions concurrent with primary user transmissions;
indexing said secondary user transmissions;
evaluating in-band distortion by calculating the total EVM resulting from a PAPR distortion of said indexed secondary user transmissions concurrent with primary user transmissions;

preparing a fitness result based on said evaluation of said error-vector-magnitude;
subjecting said fitness result to algorithmic process to generate a next generation index;
preparing a next generation data sample based on said next generation indexes, a PAPR of said next generation data sample being less than said PAPR of said indexed next generation data sample, wherein said next generation sample conforms to at least one independent international standard, wherein said indexed next generation sample is receivable by a receiver for demodulating and decoding separately each primary and secondary stream of said indexed next generation sample without requiring additional information to be transmitted outside of said protocols, and wherein a calculation of said PAPR and said total error-vector-magnitude of each concurrent primary streams and secondary streams results in a reduced total in-band interference for every primary stream and secondary stream of the collection as measured by the corresponding EVM for each.

10. The method according to claim 9, wherein said indexed next generation sample comprises multiple primary and secondary streams, wherein said next generation sample conforms to at least one independent international standard, wherein said next generation sample is receivable by a receiver for demodulating and decoding separately each constituent protocol stream of said next generation sample without requiring additional information to be transmitted outside of said protocols.

11. The method according to claim 10, further comprising calculating the composite PAPR for all primary and secondary stream, wherein said calculation of said composite PAPR of all primary and secondary stream results in a lower composite PAPR and reduce interference for all primary and secondary users.

12. The method according to claim 11, wherein said next generation sample contains an alternate representation of a primary or secondary stream, said alternate representation of said primary or secondary stream differing from said primary or secondary stream in a cyclic time shift, wherein said alternate representation of said primary or secondary stream is generated based on a characteristic of said primary or secondary stream.

13. An apparatus according to claim 12, wherein said algorithmic process outputs a set of parameters to a transmitter subsystem for producing equivalent radio frequency representations of the next generation sample.

14. The method according to claim 11, further comprising performing the algorithmic process in iterative steps, wherein each iterative step results in the lowering composite PAPR or equal composite PAPR of the previous iteration for all primary and secondary stream, and terminating the algorithmic process for composite PAPR calculations below a targeted threshold.

15. The method according to claim 14, wherein said alternate representation of said primary and secondary stream meets a regulatory emission criterion of the governing regulatory body of the country in which a transmitter transmitting said alternate representation operates.

16. The method according to claim 9, wherein the algorithmic process outputs a set of parameters to a transmitter subsystem for producing equivalent radio frequency representations of the next generation sample.

17. An apparatus according to claim 16, wherein said alternate representation of said primary and secondary stream meets a regulatory emission criterion of the governing regulatory body of the country in which the device operations.

18. The method according to claim 9, wherein the secondary user transmissions are one of an underlay transmission or an overlay transmission.

* * * * *